US006189646B1

United States Patent
Brandt et al.

(10) Patent No.: US 6,189,646 B1
(45) Date of Patent: Feb. 20, 2001

(54) TRACTION LOCK/MOMENTARY OVERRIDE

(75) Inventors: Kenneth A. Brandt, Wyndmere; Scott B. Jacobson, Kindred, both of ND (US)

(73) Assignee: Clark Equipment Company, Woodcliff Lake, NJ (US)

( * ) Notice: Under 35 U.S.C. 154(b), the term of this patent shall be extended for 0 days.

(21) Appl. No.: 09/203,192

(22) Filed: Nov. 30, 1998

(51) Int. Cl.$^7$ .................................................. B60K 28/04
(52) U.S. Cl. .......................... 180/273; 180/269; 180/271; 180/272; 340/540; 340/541
(58) Field of Search ................... 180/272, 273, 180/271, 269; 340/540, 541

(56) References Cited

U.S. PATENT DOCUMENTS

| | | | |
|---|---|---|---|
| 2,606,626 | 8/1952 | Meyer | 180/82 |
| 3,215,221 | 11/1965 | Rayman | 180/82 |
| 3,340,523 | 9/1967 | Whitman | 340/278 |
| 3,449,714 | 6/1969 | Farley, Jr. | 340/52 |
| 3,455,410 | 7/1969 | Wilson | 180/82 |
| 3,487,451 | 12/1969 | Fontaine | 303/19 |
| 3,500,946 | 3/1970 | Boyajian | 180/101 |
| 3,507,350 | 4/1970 | Boyajian | 180/101 |
| 3,740,711 | 6/1973 | Bell | 340/52 |
| 3,749,866 | 7/1973 | Tiazkun et al. | 200/85 |
| 3,787,804 | 1/1974 | MacDonald | 340/52 |
| 3,788,431 | 1/1974 | York | 188/109 |
| 3,790,223 | 2/1974 | Fontaine | 303/19 |
| 3,838,748 | 10/1974 | Gray et al. | 180/101 |
| 3,864,668 | 2/1975 | Bickford | 340/52 |
| 3,892,294 | 7/1975 | Nieminski | 188/109 |
| 3,912,939 | 10/1975 | Quantz et al. | 307/10 |
| 3,927,776 | 12/1975 | Steiger | 214/140 |
| 3,960,235 | 6/1976 | Iijima | 180/82 |
| 3,986,093 | 10/1976 | Wakamatsu et al. | 318/484 |
| 4,019,602 | 4/1977 | Habiger | 180/101 |
| 4,034,335 | 7/1977 | Harazoe et al. | 340/52 |
| 4,053,868 | 10/1977 | Cox et al. | 340/52 |
| 4,059,196 | 11/1977 | Uchino et al. | 214/138 |
| 4,091,889 | 5/1978 | Brown et al. | 180/101 |
| 4,096,468 | 6/1978 | Kopera, Jr. | 340/52 |
| 4,103,842 | 8/1978 | Martin et al. | 242/107.4 |
| 4,116,296 | 9/1978 | Pleier et al. | 180/101 |
| 4,172,980 | 10/1979 | Hsieh et al. | 307/9 |
| 4,267,544 | 5/1981 | Wiblin | 338/32 |
| 4,285,418 | 8/1981 | Paine | 188/109 |
| 4,296,410 | 10/1981 | Higgs et al. | 340/685 |
| 4,313,519 | 2/1982 | Lipschutz | 180/270 |
| 4,317,500 | 3/1982 | Bening | 180/273 |
| 4,320,819 | 3/1982 | Erker | 188/109 |
| 4,344,502 | 8/1982 | Terabayashi | 180/268 |
| 4,355,698 | 10/1982 | Barnes et al. | 180/273 |
| 4,361,741 | 11/1982 | Leskoverc et al. | 200/85 |
| 4,371,741 | 2/1983 | Ando et al. | 174/15 |

(List continued on next page.)

OTHER PUBLICATIONS

"Fluid power in action: mobile equipment", by R.T. Schneider, Aug. 1993, *Hydraulics & Pneumatics*, pp. 29–30.
"Hand Pump Series HP 101", brochure, Feb. 1994, Parker Hannifin Corporation, Elvira, Ohio, 2 pages.

*Primary Examiner*—Brian L. Johnson
*Assistant Examiner*—Deanna L. Draper
(74) *Attorney, Agent, or Firm*—Westman, Champlin & Kelly, P.A.

(57) ABSTRACT

A control system on a power machine which includes a first sensor sensing a first operating condition and providing a first sensor signal. An operator actuable override mechanism provides an override signal in response to actuation thereof. A controller is coupled to the first sensor, a power circuit, a traction lockout mechanism, and the override mechanism. The controller is configured to instate a lockout condition in response to the first sensor signal. The controller selectively overrides the lockout condition based on the override signal, and the first sensor signal.

21 Claims, 5 Drawing Sheets

U.S. PATENT DOCUMENTS

| | | | |
|---|---|---|---|
| 4,385,863 | 5/1983 | Minor | 414/699 |
| 4,388,980 | 6/1983 | Vig et al. | 180/271 |
| 4,389,154 | 6/1983 | Minor et al. | 414/699 |
| 4,391,344 | 7/1983 | Weber et al. | 180/271 |
| 4,392,544 | 7/1983 | Dilno | 180/273 |
| 4,397,371 | 8/1983 | Lynnes et al. | 180/271 |
| 4,398,618 | 8/1983 | Hansen | 180/273 |
| 4,466,504 | 8/1984 | Giandenoto et al. | 180/273 |
| 4,480,713 | 11/1984 | Macht et al. | 180/268 |
| 4,546,266 | 10/1985 | Zenick et al. | 307/10 |
| 4,550,597 | 11/1985 | Drutchas et al. | 73/118 |
| 4,579,191 | 4/1986 | Klee et al. | 180/268 |
| 4,655,313 | 4/1987 | Hicks | 180/273 |
| 4,673,054 | 6/1987 | Burke et al. | 180/271 |
| 4,706,194 | 11/1987 | Webb et al. | 364/424 |
| 4,727,353 | 2/1988 | Ruhter | 340/52 |
| 4,759,185 | 7/1988 | McConnell et al. | 60/444 |
| 4,796,013 | 1/1989 | Yasuda et al. | 340/562 |
| 4,844,196 | 7/1989 | Clevenger, Jr. et al. | 180/273 |
| 4,856,612 | 8/1989 | Clevenger, Jr. et al. | 180/273 |
| 4,871,044 | 10/1989 | Strosser et al. | 180/273 |
| 4,902,039 | 2/1990 | Kawai et al. | 280/802 |
| 4,909,560 | 3/1990 | Ginn | 296/65.1 |
| 4,951,963 | 8/1990 | Behr et al. | 280/753 |
| 4,955,452 | 9/1990 | Simonz | 180/271 |
| 4,955,455 * | 9/1990 | Albright et al. | 180/291 |
| 5,050,700 | 9/1991 | Kim | 180/268 |
| 5,109,945 | 5/1992 | Koga | 180/273 |
| 5,129,478 | 7/1992 | Suenaga et al. | 180/268 |
| 5,203,440 | 4/1993 | Peterson, Jr. et al. | 192/0.094 |
| 5,425,431 | 6/1995 | Brandt et al. | 180/273 |
| 5,542,493 * | 8/1996 | Jacobson et al. | 180/272 |
| 5,551,523 * | 9/1996 | Berg et al. | 180/273 |
| 5,577,876 * | 11/1996 | Haeder et al. | 414/699 |
| 5,664,637 * | 9/1997 | Ohta et al. | 180/286 |
| 5,711,391 * | 1/1998 | Brandt et al. | 180/273 |
| 5,931,254 * | 8/1999 | Loraas et al. | 180/272 |

\* cited by examiner

TRACTION LOCK/MOMENTARY OVERRIDE

INCORPORATION BY REFERENCE

The following U.S. Patent is hereby fully incorporated by reference:

U.S. Pat. No. 5,425,431 entitled INTERLOCK CONTROL SYSTEM FOR POWER MACHINE issued Jun. 20, 1995 and assigned to the same Assignee as the present application.

BACKGROUND OF THE INVENTION

The present invention relates to power machinery. More particularly, the present invention relates to an apparatus for controlling operation of a lockout system for power machinery.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by another power actuator which is also commonly a hydraulic cylinder. An operator manipulating the skid steer loader raises and lowers the lift arm, and manipulates the tool, by actuating the hydraulic cylinders coupled to the lift arm, and the hydraulic cylinder coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinder coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

It is desirable that, under certain circumstances, the lift arm, the tool, the traction mechanism, or all three, be rendered inoperable. For example, in some prior devices, when an operator leaves the cab of the skid steer loader or assumes an unconventional operating position, the hydraulic cylinders used to raise and lower the lift arm are locked out of operation. In such prior devices, an operator presence switch is coupled to the hydraulic circuit controlling the hydraulic cylinders to render the hydraulic lift cylinders inoperable when the operator presence switch indicates that the operator is in an unconventional operating position. One example of such a system is set out in the Minor et al U.S. Pat. No. 4,389,154.

In addition, in some prior devices, movable operator restraint bars are provided. When the operator restraint bars are moved to a retracted or inoperative position, mechanical brakes or wheel locks lock the wheels of the skid steer loader. One example of such a system is set out in the Simonz U.S. Pat. No. 4,955,452.

SUMMARY OF THE INVENTION

The present invention is drawn to a control system on a power machine which includes a first sensor sensing a first operating condition and providing a first sensor signal. An operator actuable override mechanism provides an override signal in response to actuation thereof. A controller is coupled to the first sensor, a power circuit, a traction lockout mechanism, and the override mechanism. The controller is configured to instate a lockout condition in response to the first sensor signal. The controller selectively overrides the lockout condition based on the override signal, and the first sensor signal.

DETAILED DESCRIPTION OF THE PREFERRED EMBODIMENTS

Overview

Figure 1:
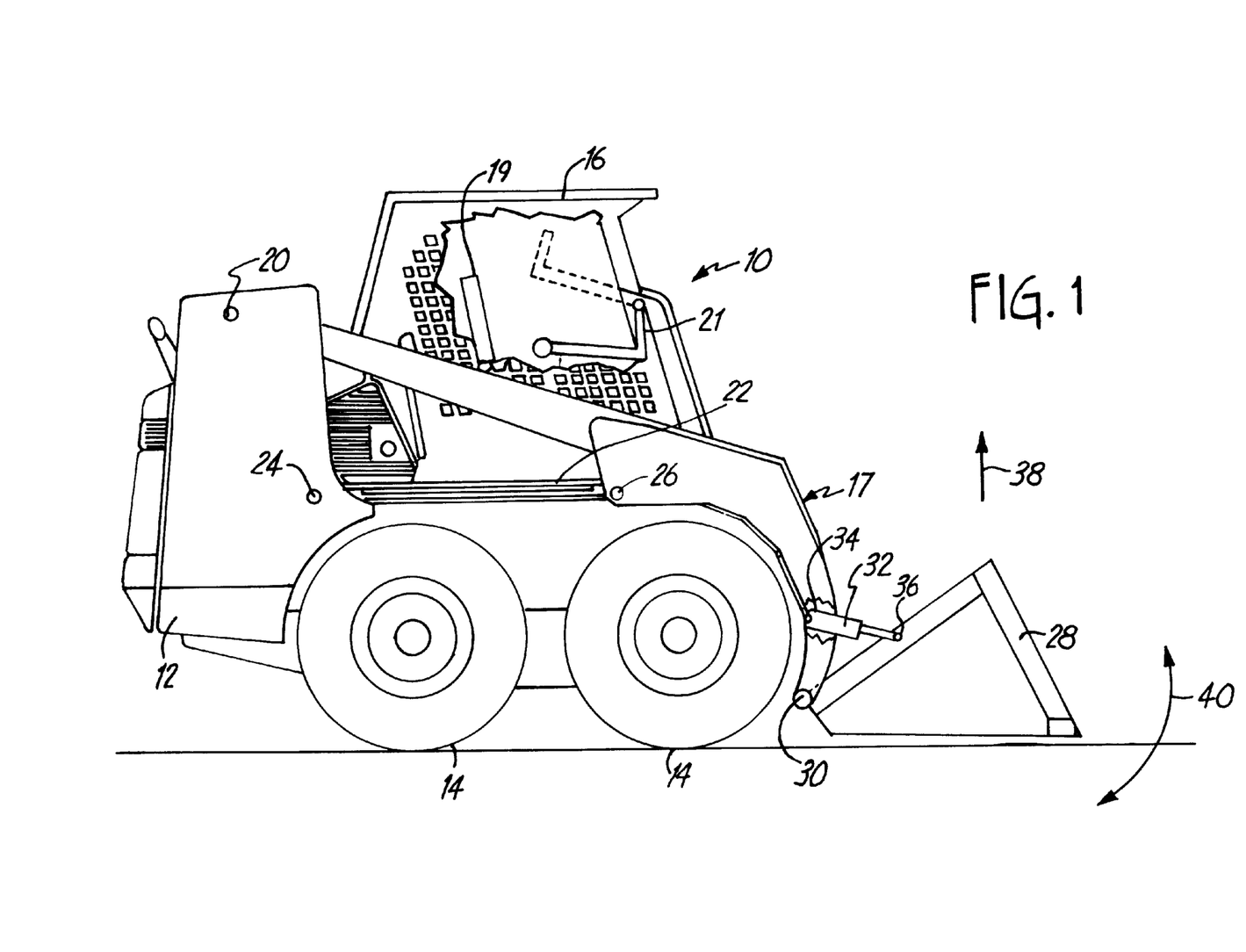
FIG. 1 is a side elevational view of a skid steer loader in accordance with the present invention.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. A seat bar 21 is pivotally coupled to a portion of cab 16. When the operator occupies seat 19, the operator then pivots seat bar 21 from the raised position (shown in phantom in FIG. 1) to the lowered position shown in FIG. 1.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

Lockout Control Circuit 42

Figure 2:
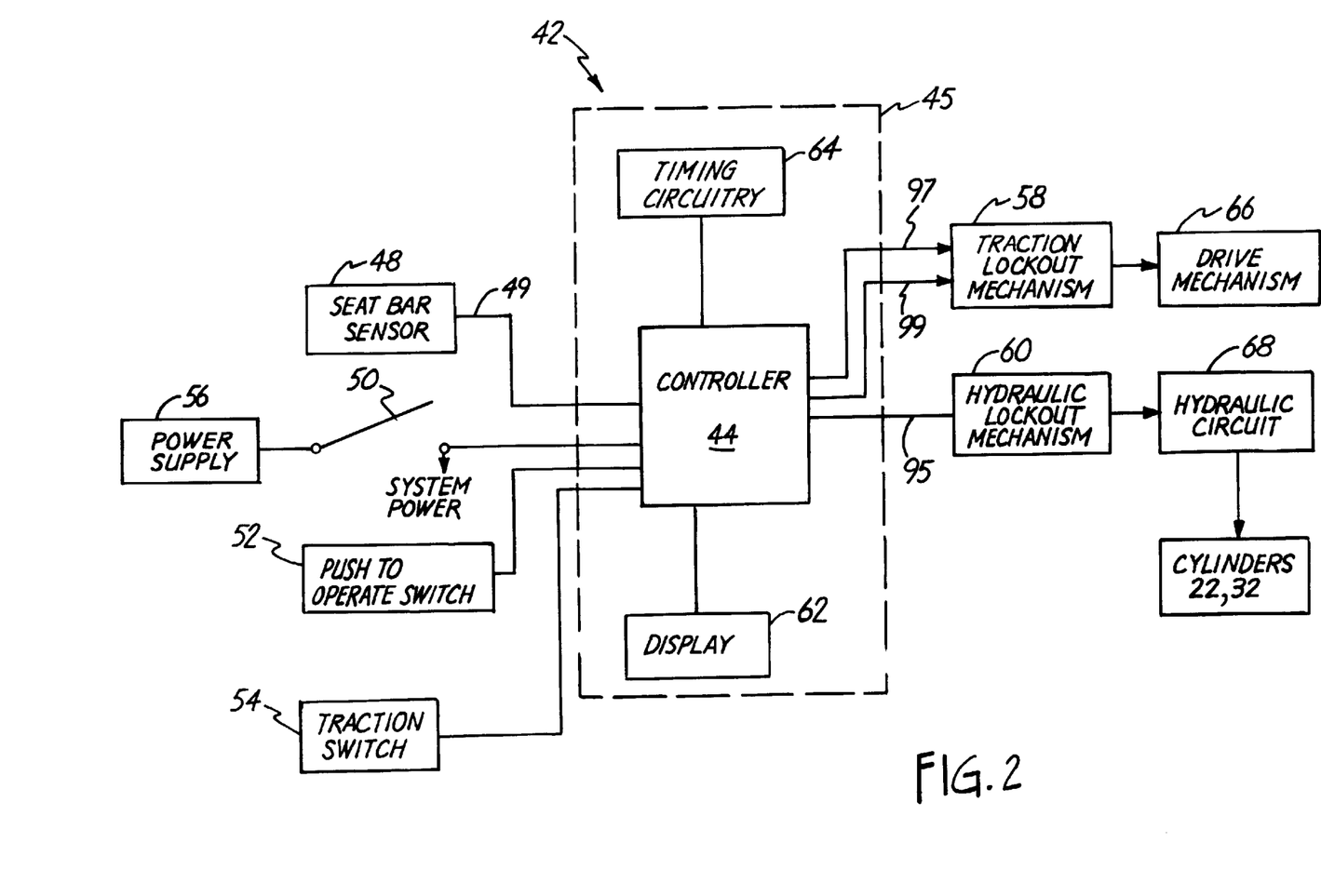
FIG. 2 is a block diagram of a control system illustrating one aspect of the present invention.

FIG. 2 illustrates a control circuit 42 in accordance with one aspect of the present invention. Control circuit 42 includes controller 44 which receives inputs from seat bar sensor 48, ignition switch 50, push to operate (PTO) switch or button 52 and traction lock switch 54. Ignition switch 50 is coupled to a power supply 56. Upon closing of ignition switch 50, power is supplied from power supply 56 to the remainder of the system.

Based on the inputs received, controller 44 provides outputs to traction lock mechanism 58 and hydraulic lock mechanism 60. In one illustrative embodiment, controller 44 provides two outputs to traction lock mechanism 58, one output to hydraulic lock mechanism 60 and an output to display 62 which is integrated in controller 44 in the preferred embodiment. Controller 44 also provides an output to timer 64 which is also integrated in controller assembly 45 in the preferred embodiment.

Based on the inputs from controller 44, traction lock mechanism 58 and hydraulic lock mechanism 60 provide outputs to drive mechanism 66 and hydraulic circuit 68, respectively. Hydraulic circuit 68, in turn, provides an output to lift and tilt cylinders 22 and 32.

Seat bar sensor 48, in the preferred embodiment, is a Hall effect position sensor more fully described in U.S. Pat. No. 5,542,493 issued Aug. 6, 1996, and assigned to the same assignee as the present invention. Seat bar sensor 48 is activated when the operator pulls seat bar 21 into the lowered position shown in FIG. 1. In the preferred embodiment, seat bar sensor 48 provides a signal to controller 44 which is active when seat bar 21 is in the lowered position and inactive when seat bar 21 is in the raised position (or is moved out of the lowered position). While seat bar sensor 48 is preferably the Hall effect sensor described in the above-mentioned U.S. patent, any suitable position switch can be used as seat bar sensor 48.

Ignition switch 50 is a typical key-type ignition switch or push button switch on a keypad used in supplying power from power supply 56 to the basic electrical system in skid steer loader 10. Upon the closure of ignition switch 50, power is also supplied to controller 44. Upon receiving power, controller 44 initializes itself and begins to run.

Traction lock switch 54 can be embodied as an operator actuable input device, such as a push button, a switch on a control panel or steering lever hand grips in the operating compartment of the skid steer loader, or as an operator-controlled pedal actuated switch accessible from the operator compartment defined by cab 16. In the embodiment in which switch 54 is a pedal actuated switch, the pedal is preferably configured as an over-center device. When the operator actuates traction lock switch 54, traction lock switch 54 provides an input to controller 44 requesting controller 44 to activate traction lock mechanism 58. In one illustrative embodiment described below, controller 44 removes power from traction lock mechanism 58, causing traction lock mechanism 58 to lock drive mechanism 66.

PTO switch 52 is a manually operated switch which is also preferably located in the operator compartment defined by cab 16. Switch 52 can be of any suitable configuration, but is preferably a push button switch located on a dash panel in a forward region of the operator compartment. Switch 52 is described in greater detail below.

Figure 3:
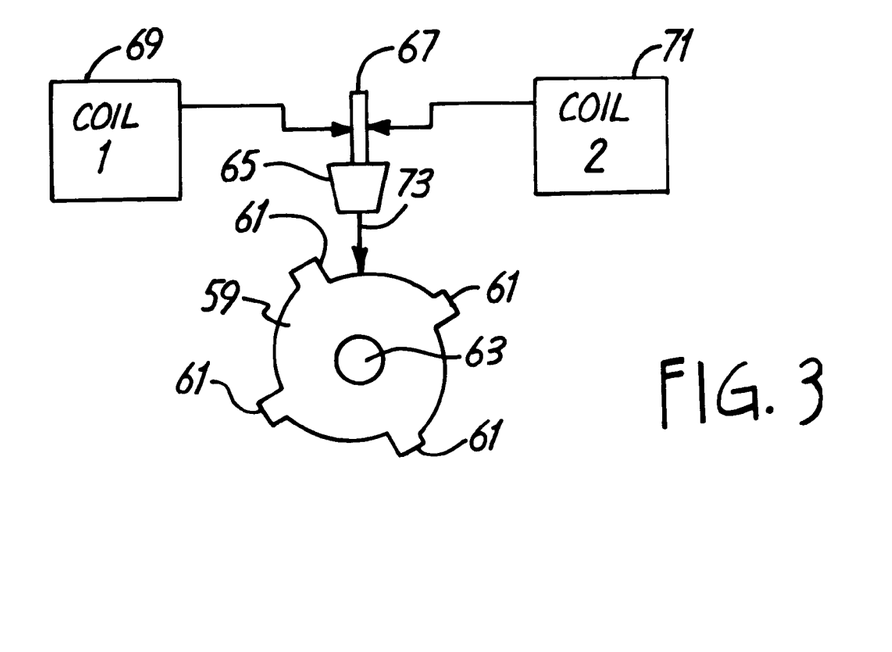
FIG. 3 is a more detailed block diagram of a traction lock mechanism.

The traction lock mechanism 58 can take any number of suitable forms. In one illustrative embodiment, traction lock mechanism 58 comprises the mechanism more fully described in U.S. Pat. No. 5,551,523, issued on Sep. 3, 1996, and assigned to the same assignee as the present application. Briefly, traction lock mechanism 58 is configured as shown in FIG. 3 with a disc 59 having a number of lugs 61 mounted to a portion of the drive mechanism 66, such as one of the axles 63 or a drive train component used in driving wheels 14 on loader 10. A wedge 65 is manipulated by a solenoid slug or plunger 67 which is coupled to two coils 69 and 71. The coils are shown schematically and actually are coiled one inside the other around the slug 67. When the wedge 65 is allowed to drop onto the disc 59 in the direction indicated by arrow 73, the wedge 65 is engaged by a lug 61 and locks up the axle 63 precluding rotation of axle 63 and therefore precluding movement of loader 10. When the wedge 65 is lifted out of the path of lugs 61 on the disc 59, the axle 63 is unlocked and the loader 10 is allowed to move.

The two coils 69 and 71 operating the solenoid 67 include first coil 69 which is a relatively high current coil that is used to pull the wedge 65 up to clear lugs 61. Once the wedge 65 is pulled out of the path of lugs 61, the first coil 69 (the pull coil) is de-energized and second, hold coil 71, is energized. The hold coil 71 is a lower current coil which is used to hold the metal wedge 65 in place, out of engagement with the disc 59 mounted to the axle 63. Thus, controller 44 controls the coils to either allow the wedge 65 to drop into the path of lugs 61 on the drive mechanism 66 thereby locking the drive mechanism 66, or to pull and hold the wedge 65 out of engagement with the drive mechanism 66, thus allowing the loader 10 to move.

Hydraulic lock mechanism 60 is more fully described in U.S. Pat. No. 5,577,876 issued Nov. 26, 1996 entitled HYDRAULIC INTERLOCK SYSTEM, and assigned to the same assignee as the present invention. Briefly, hydraulic circuit 68 includes hydraulic valves which are actuated to provide fluid under pressure to cylinders 22 and 32 to achieve desired manipulation of cylinders 22 and 32. Hydraulic lock mechanism 60, in the preferred embodiment, includes any number of lock valves interposed between the valves in hydraulic circuit 68 and cylinders 22 and 32. Upon receiving appropriate control signals from controller 44, the lock valves and hydraulic lock mechanism 60 preclude hydraulic circuit 68 from providing fluid under pressure to cylinders 22 and 32, thereby locking operation of cylinders 22 and 32, or allowing only selected operations of cylinders 22.

Normal Operation of Circuit 42

Normal operation is described here briefly and is described in greater detail below with respect to FIGS. 5 and 6. During normal operation of circuit 42, an operator enters the operator compartment defined by cab 16 and occupies seat 19. The operator then lowers seat bar 21 into the lowered position shown in FIG. 1. The operator then closes ignition switch 50 supplying power to the basic electrical system and to controller assembly 45 and to the remainder of the control system. Sensor 48 provides a signal to controller 44 indicating that seat bar 21 is in the lowered position.

Upon receiving such signal, controller 44 provides the appropriate signals to traction lock mechanism 58 to unlock drive mechanism 66 and allow movement of loader 10, and to hydraulic lock mechanism 60 to unlock hydraulic circuit 68 and allow manipulation of hydraulic cylinders 22 and 32. Also, controller 44 provides signals to display 62 which indicates that seat bar 21 is in the lowered position, hydraulic lock mechanism 60 has been sent a signal by controller 44 to unlock hydraulic circuit 68, traction lock mechanism 58 has been sent a signal by controller 44 to unlock drive mechanism 66 and controller 44 does not detect any system problems.

If controller 44 has not received a signal from seat bar sensor 48 indicating seat bar 21 is in the down position (as shown in FIG. 1) controller 44 provides appropriate signals to traction lock mechanism 58 and hydraulic lock mechanism 60, locking drive mechanism 66 and hydraulic circuit 68. This is described in greater detail below.

If, during operation of loader 10, the operator raises seat bar 21 to the raised position shown in phantom in FIG. 1 (from the lowered position) or lowers seat bar 21 (from the raised position), seat bar sensor 48 provides controller 44 with a signal indicating that seat bar 21 has been raised or lowered. Controller 44 then provides output signals to traction lock mechanism 58 to lock out drive mechanism 66 and hydraulic lock mechanism 60 to lock out hydraulic circuit 68. This condition is also described in greater detail below.

Traction Lock Switch Function

During normal operation of loader 10, the operator can command controller 44 to lock drive mechanism 66, regardless of the signals returned to controller 44 by seat bar sensor 48 by actuating traction lock switch 54, which, in the preferred embodiment, is actuated by an over-center pedal device. When traction lock switch 54 sends the appropriate signal to controller 44, controller 44 provides an output signal to traction lock mechanism 58 to lock drive mechanism 66. By reverse actuation of traction lock switch 54, which will remove the signal to controller 44, the state of traction lock mechanism 58 and drive mechanism 66 will once again depend upon the signals received from seat bar sensor 48.

Push to Operate (PTO) Switch 52

Figure 4:
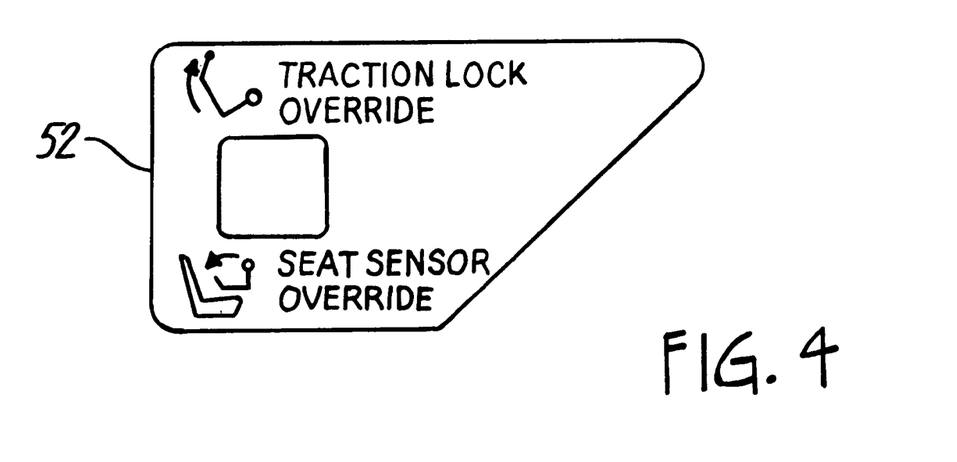
FIG. 4 is an illustrative rendering of an operator actuable override mechanism in accordance with one aspect of the present invention.

FIG. 4 illustrates one embodiment of switch 52. Switch 52 is illustratively a push button actuable switch located on a front dash in cab 16 or on a front display panel, forwardly located in cab 16. However, switch 52 can be located at any suitable position on loader 10, and can be configured in any manner. When switch 52 is depressed by the operator, controller 44 receives a signal indicative of that depression, and takes various actions, depending upon a current state of various operating and sensor parameters.

Figure 5:
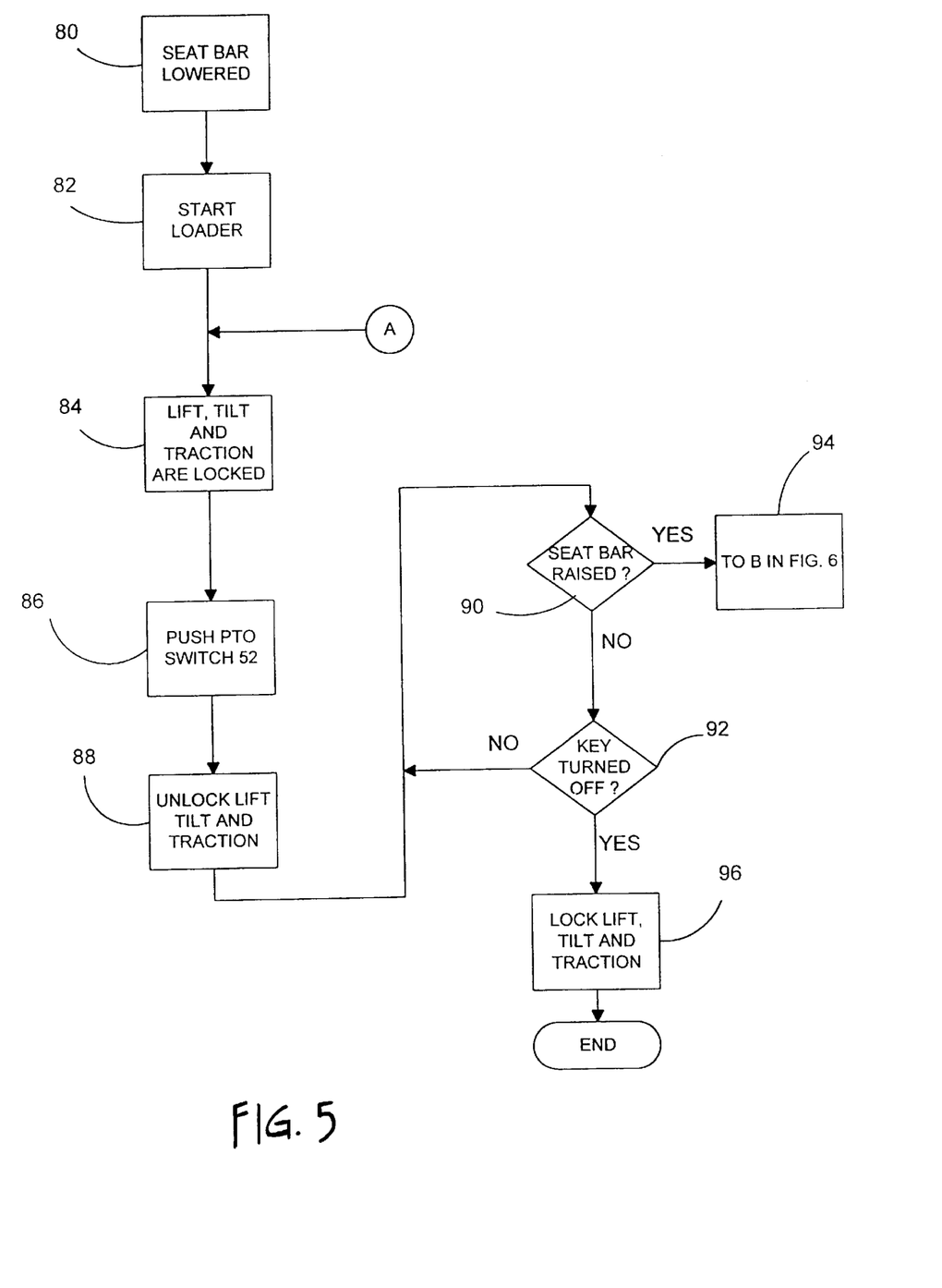
FIGS. 5–6 are flow diagrams illustrating the operation of the control system of FIG. 2 in accordance with various aspects of the present invention.

FIG. 5 is a flow diagram illustrating the operation of circuit 42 in response to depression of switch 52 in accordance with one aspect of the present invention. Under normal conditions, when an operator is to operate loader 10 from within cab 16, the operator enters the loader, sits in seat 19 and lowers seat bar 21 to the lowered position. This is indicated by block 80. The operator then closes ignition switch 50 and starts loader 10. This is indicated by block 82. Upon being initially powered up, controller 44 provides signals to traction lockout mechanism 58 and hydraulic lockout mechanism 60 to lock drive mechanism 66 and hydraulic circuit 68 such that the loader 10 cannot be driven, and such that the lift and tilt functions (or cylinders) are locked. This is indicated by block 84. Next, the operator depresses button 52, as indicated by block 86. Controller 44, in response to the signal received based on depression of button or switch 52, provides signals to traction lockout mechanism 58 and hydraulic lockout mechanism 60 to unlock the traction drive mechanism 66 and the lift and tilt cylinders in hydraulic circuit 68. This is indicated by block 88. Controller 44 also provides signals to display 62 to provide a display indicating the current state of circuit 42 (e.g., that the traction drive mechanism is enabled and the lift and tilt functions are also enabled). In one illustrative embodiment, display 62 is simply embodied as a green indicator light on a dash or display panel in cab 16. In that embodiment, controller 44 simply provides a signal to the indicator light causing the indicator light to remain lit.

Once in this state, the operator can operate loader 10 in the normal fashion. In other words, the operator can drive and steer loader 10, as well as operate auxiliary power features on loader 10 and the lift and tilt features on loader 10. Circuit 42 remains in this state, allowing normal operation of loader 10, until either seat bar 21 is moved out of the lowered position, or until switch 50 is opened (such as when an ignition keyswitch is turned off). This is indicated by blocks 90 and 92.

Figure 6:
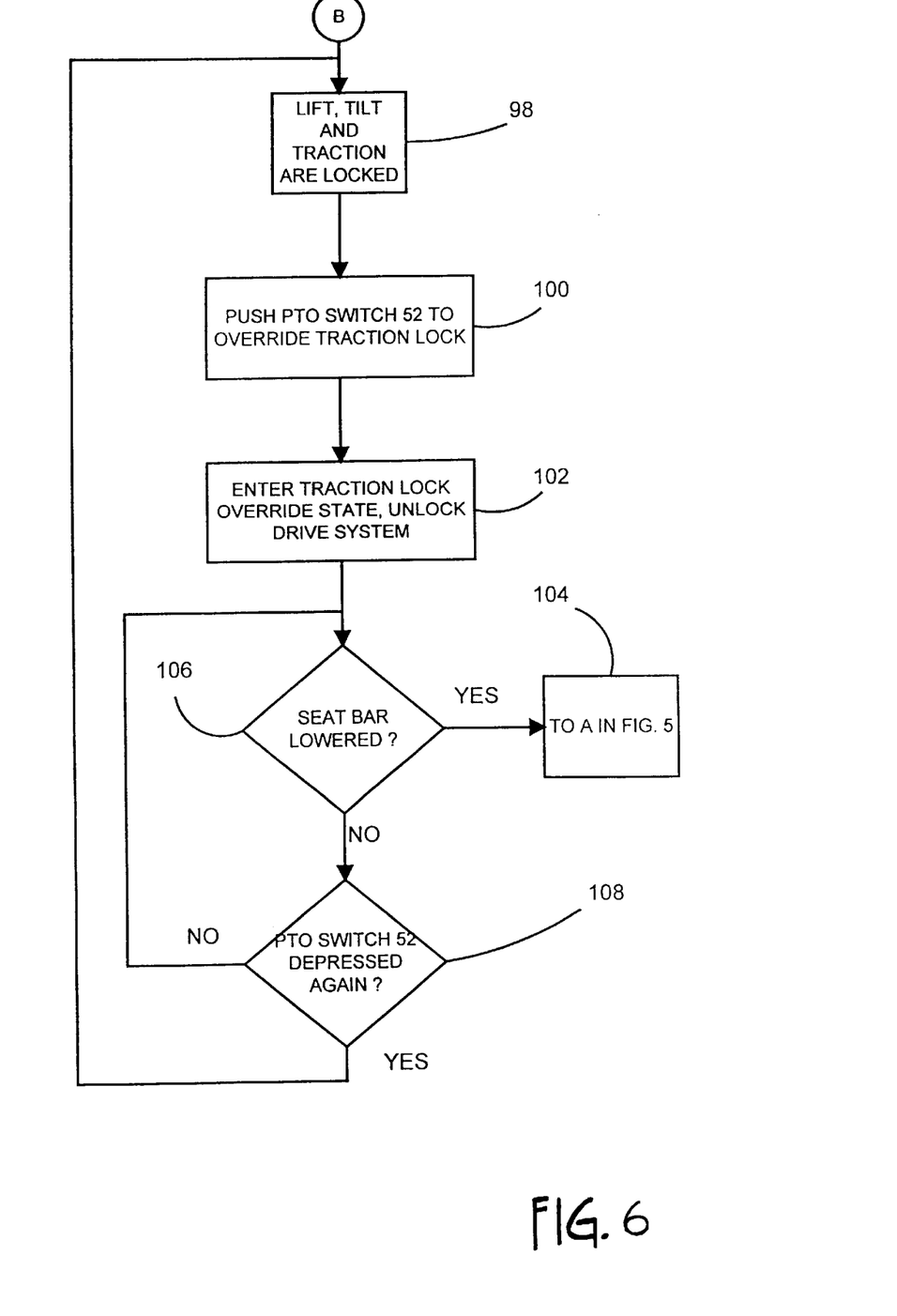

If the seat bar 21 is raised, as indicated by block 90, the lift, tilt, and traction functions are locked and control proceeds to block 98 in FIG. 6. This is indicated by block 94 in FIG. 5, and is described in greater detail below, with respect to FIG. 6.

If the key is turned off, as indicated by block 92, the lift, tilt, and traction functions are all locked, or disabled, and the loader is shut down. This is indicated by block 96. When the loader is restarted, assuming seat bar 21 is in the lowered position, processing simply proceeds as indicated with respect to blocks 80–96 in FIG. 5.

It is sometimes desirable to move loader 10 when controller 44 has sent a signal to traction lock mechanism 58 to lock drive mechanism 66. For example, loaders, such as loader 10, are often equipped with a backhoe attachment which includes its own seat mounted outside and to the front of cab 16. When an operator operates the backhoe attachment, seat bar sensor 48 typically indicates that seat bar 21 is in the raised position. The seat provided on the backhoe attachment is commonly a swivel seat so that the operator can face in a direction to operate the backhoe attachment, and swivel around to face cab 16.

In accordance with one aspect of the present invention, PTO switch 52 is provided for overriding the traction lockout condition instated by controller 44 in response to signals from seat bar sensor 48 indicating that seat bar 21 is in the raised position.

If seat bar 21 is in the raised position, seat bar sensor 48 provides controller 44 with the signal indicative of that. This is true, regardless of whether loader 10 is started with seat bar 21 in the raised position, or whether loader 10 is started with seat bar 21 in the lowered position, and seat bar 21 is subsequently raised (such as when processing continues from block 94 in FIG. 5). In any case, when seat bar 21 is in the raised position, controller 44 controls traction lockout mechanism 58 and hydraulic lockout mechanism 60 to lock the traction, lift and tilt functions of loader 10. This is indicated by block 98 in FIG. 6.

The traction lock state (in which the drive mechanism 66 is locked) can be overridden by the operator, by simply depressing button 52. Therefore, for instance, when the operator is operating a backhoe attachment, and the operator wishes to drive loader 10, the operator can simply swivel the backhoe seat, depress button 52, and move loader 10 into the desired position. This is indicated by blocks 100 and 102.

Controller 44 can control circuit 42 in a number of different ways to override the traction lockout condition. For instance, controller 44 can place circuit 42 in the traction override condition (overriding the traction lockout condition) momentarily, in the instance in which switch 52 is implemented as a momentary switch. Similarly, controller 44 can place circuit 42 in the traction lock override condition for a predetermined time period, once switch 52 has been depressed and then automatically revert to the traction lockout condition after the predetermined time period. In the illustrative embodiment, however, depression of switch 52 simply toggles operation of controller 44. In other words, the first time push button 52 is depressed when seat bar 21 is in the raised position, controller 44 controls circuit 42 to enter the traction lock override condition in which the drive mechanism 66 is unlocked.

Controller 44 retains circuit 42 in that condition until either seat bar 21 is lowered, or until button 52 is again depressed. If seat bar 21 is lowered, control reverts to block 84 in FIG. 5 in which lift, tilt and traction functions are all locked again. This is indicated by blocks 104 and 106 in FIG. 6. However, if button 52 is subsequently pressed, controller 44 simply toggles operation of circuit 42 such that circuit 42 is again placed in the traction lock state in which drive mechanism 66 is locked. Therefore, once the operator has moved loader 10 into the desired position (in the example in which the backhoe attachment is mounted on loader 10) the operator can then again simply depress button 52 to lock drive mechanism 66 and continue operation of the backhoe attachment. This is indicated by block 108 in FIG. 6.

Of course, when the key is turned off in loader 10, the lift, tilt and traction functions are all locked and the engine is shut down.

It should also be noted that controller 44 can provide an appropriate display on display 62 indicating that either the traction lock, or the traction lock override conditions have been instated. For instance, where display 62 is simply a light on the dashboard, the light can be controlled to flash in one or more flash patterns, depending on the particular condition which is then instated.

Thus, it can be seen that the present invention provides an efficient mechanism by which an operator can temporarily override lockout conditions previously instated by the control system. By utilizing switch 52, the operator can override the traction lock condition (or state) and can also be used to initially unlock various loader functions. The override states are also terminated in a convenient manner (such as by moving the seat bar or again depressing switch 52). Such a mechanism enhances the functionality of loader 10.

Although the present invention has been described with reference to preferred embodiments, workers skilled in the art will recognize that changes may be made in form and detail without departing from the spirit and scope of the invention.

What is claimed is:

1. A power machine including a traction mechanism for driving the power machine, and a power actuator, comprising:
   a first sensor sensing a first operating condition and providing a first sensor signal indicative of the first operating condition;
   a traction lockout mechanism coupled to the traction mechanism to selectively lock the traction mechanism;
   an operator actuable override mechanism providing an override signal in response to actuation thereof;
   a power circuit coupled to the traction mechanism and the power actuator to provide power to the traction mechanism and the power actuator; and
   a controller coupled to the first sensor, the power circuit, the traction lockout mechanism, and the override mechanism and configured to instate a first lockout condition in which a plurality of functions are locked out in response to the first sensor signal and to selectively override the first lockout condition based on the override signal, and the first sensor signal.

2. The power machine of claim 1 wherein the power machine includes:
   a movable element, movable between a first position proximate a seat and a second position wherein the movable element is disposed further from the seat in the second position than in the first position, and wherein the first sensor provides the first sensor signal indicative of the position of the movable element.

3. The power machine of claim 2 wherein the controller instates a traction lockout condition in response to the movable element being in the second position.

4. The power machine of claim 3 wherein the controller overrides the traction lockout condition in response to the override signal when the movable element is in the second position.

5. The power machine of claim 4 wherein the controller reinstates the traction lockout condition in response to a next subsequent override signal.

6. The power machine of claim 5 wherein the controller overrides the traction lockout condition in response to the override signal when the movable element is in the second position and reinstates the traction lockout condition when the movable element is subsequently moved to the first position.

7. The power machine of claim 6 wherein the movable element comprises a seat bar.

8. The power machine of claim 2 wherein, upon power up, a plurality of functions of the power machine are locked out and a traction lockout condition is instated, and wherein the controller is configured to unlock the functions in response to the movable element being in the first position and in response to the override signal.

9. The power machine of claim 8 wherein the controller is configured to re-instate the traction lockout condition and to lockout the plurality of functions in response to the movable element being moved to the second position.

10. A control component in a power machine including a traction mechanism for driving the power machine, and a power actuator, the control component comprising:
    a first sensor sensing a first operating condition and providing a first sensor signal indicative of the first operating condition;
    a traction lockout mechanism coupled to the traction mechanism to selectively lock the traction mechanism;
    an operator actuable override mechanism providing an override signal in response to actuation thereof;
    a power circuit coupled to the traction mechanism and the power actuator to provide power to the traction mechanism and the power actuator; and
    a controller coupled to the first sensor, the power circuit, the traction lockout mechanism, and the override mechanism and configured to instate a first lockout condition in which a plurality of functions are locked out in response to the first sensor signal and to selectively override the first lockout condition based on the override signal, and the first sensor signals.

11. The control component of claim 10 wherein power machine includes a movable element, movable between a first position proximate the seat and a second position wherein the movable element is disposed further from the seat than in the first position, and wherein the first sensor provides the first sensor signal indicative of the position of the movable element.

12. The control component of claim 11 wherein the controller instates a lockout condition, upon power up, in which traction and certain power actuator functions are locked out and wherein the controller is configured to override the lockout condition in response to the override signal when the movable element is in the first position.

13. The control component of claim 12 wherein the controller is configured to override the lockout condition in response to the override signal when the movable element is in the first position and to reinstate the lockout condition when the movable element is moved to the second position.

14. The control component of claim 12 wherein the controller is configured to override lockout of the traction function in response to the override signal when the movable element is in the second position.

15. The control component of claim 14 wherein, when the movable element is in the second position, the controller overrides lockout of the traction function in response to the override signal and reinstates lockout of the traction function in response to a subsequent actuation of the override mechanism.

16. The control component of claim 14 wherein the controller overrides lockout of the traction function in response to the override signal when the movable element is in the second position and reinstates lockout of the traction function when the movable element is subsequently moved to the first position.

17. A skid steer loader having a frame, the skid steer loader comprising:
   a traction mechanism, coupled to the frame, driving the skid steer loader;
   a traction lock mechanism selectively coupleable to the traction mechanism to lock the traction mechanism;
   a seat coupled to the frame;
   a seat bar movable between a first position proximate the seat and a second position located further from the seat than when in the first position;
   a seat bar sensor providing a seat bar signal indicative of the position of the seat bar;
   a power actuator coupled to the frame;
   a power circuit providing power to the power actuator;
   an operator actuable override mechanism providing an override signal in response to actuation thereof; and
   a controller coupled to the traction lock mechanism, the seat bar sensor, the power circuit and the override mechanism;
   wherein the controller controls the power circuit and the traction lock mechanism to enter a traction lockout condition locking the traction mechanism in response to the seat bar signal indicating that the seat bar is in the second position;
   wherein the controller overrides the traction lockout condition in response to the override signal based on the seat bar signal;
   wherein, upon power up, a plurality of functions of the power machine are locked out; and
   wherein the controller is configured to unlock the functions in response to the movable element being in the first position and in response to the override signal.

18. The skid steer loader of claim 17 wherein the controller overrides the traction lockout condition in response to the override signal when the seat bar is in the second position.

19. The skid steer loader of claim 18 wherein, when the seat bar is in the second position, the controller overrides the traction lockout condition in response to the override signal and reinstates the traction lockout condition in response to a subsequent actuation of the override mechanism.

20. The skid steer loader of claim 19 wherein the controller overrides the traction lockout condition in response to the override signal when the seat bar is in the second position and reinstates the traction lockout condition when the seat bar is subsequently moved to the first position.

21. A power machine including a traction mechanism for driving the power machine, and a power actuator, comprising:
   a movable element, movable between a first position proximate a seat and a second position wherein the movable element is disposed further from the seat in the second position a in the first position;
   a sensing mechanism providing a signal indicative of the position of the movable element;
   an actuable operation mechanism providing an operation signal upon actuation thereof;
   a traction lock mechanism coupled to the traction mechanism to selectively lock the traction mechanism;
   a power circuit coupled to the traction mechanism and the power actuator to provide power to the traction mechanism and the power actuator;
   the power machine being configurable in a run condition wherein a plurality of functions are unlocked, and a locked condition wherein the plurality of functions are locked; and
   a controller coupled to the sensing mechanism, the power circuit, the traction lock mechanism, and the operation mechanism and configured to change the condition of the power machine upon actuation of the operation mechanism depending upon the position of the movable element wherein, upon power up, the locked condition is instated and the controller changes the condition of the power machine to the run condition in response to the operation signal.

* * * * *